US009939957B2

(12) United States Patent
Chiang

(10) Patent No.: US 9,939,957 B2
(45) Date of Patent: Apr. 10, 2018

(54) METHOD AND ASSOCIATED CONTROLLER FOR ADAPTIVELY ADJUSTING TOUCH CONTROL THRESHOLD

(71) Applicant: MStar Semiconductor, Inc., Hsinchu Hsien (TW)

(72) Inventor: Ching-Chun Chiang, New Taipei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 120 days.

(21) Appl. No.: 14/933,105

(22) Filed: Nov. 5, 2015

(65) Prior Publication Data

US 2017/0060335 A1    Mar. 2, 2017

(30) Foreign Application Priority Data

Aug. 28, 2015 (TW) .............................. 104128327 A

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
CPC ................................ G06F 3/0418; G06F 3/044
See application file for complete search history.

(56) References Cited

U.S. PATENT DOCUMENTS

| | | | | |
|---|---|---|---|---|
| 9,524,067 | B2 * | 12/2016 | Soo | G06F 3/044 |
| 2008/0012835 | A1 * | 1/2008 | Rimon | G06F 3/038 |
| | | | | 345/173 |
| 2008/0158146 | A1 * | 7/2008 | Westerman | G06K 9/00375 |
| | | | | 345/156 |
| 2008/0158174 | A1 * | 7/2008 | Land | G06F 3/0418 |
| | | | | 345/173 |
| 2009/0078476 | A1 * | 3/2009 | Rimon | G06F 3/03545 |
| | | | | 178/18.03 |
| 2009/0284492 | A1 * | 11/2009 | Chino | G06F 3/0412 |
| | | | | 345/174 |
| 2010/0134442 | A1 * | 6/2010 | Yang | G06F 3/0418 |
| | | | | 345/175 |
| 2010/0245216 | A1 * | 9/2010 | Nakamura | H01L 27/3269 |
| | | | | 345/76 |
| 2010/0277429 | A1 * | 11/2010 | Day | G06F 3/0416 |
| | | | | 345/173 |

(Continued)

FOREIGN PATENT DOCUMENTS

TW          201423609 A      6/2014

OTHER PUBLICATIONS

TIPO Office Action, dated Dec. 27, 2016, 4 pages.

*Primary Examiner* — Jose Soto Lopez
(74) *Attorney, Agent, or Firm* — Edell, Shapiro & Finnan, LLC

(57) ABSTRACT

A method for adaptively adjusting a touch control threshold of a touch panel is provided. The method includes: receiving a set of sample values from the touch panel; calculating a mean value and a standard deviation based on the set of sample values according to a determination result indicating that the set of sample values are not greater than the touch control threshold; and updating the touch control threshold according to the mean value and the standard deviation.

14 Claims, 5 Drawing Sheets

(56) References Cited

U.S. PATENT DOCUMENTS

| | | | |
|---|---|---|---|
| 2011/0221701 A1* | 9/2011 | Zhang | G06F 3/0418 345/174 |
| 2011/0242022 A1* | 10/2011 | Wen | G06F 3/0416 345/173 |
| 2011/0279386 A1* | 11/2011 | Chang | G06F 3/0416 345/173 |
| 2012/0008839 A1* | 1/2012 | Hirota | G06T 7/0012 382/128 |
| 2012/0188066 A1* | 7/2012 | Ujii | G03B 17/38 340/407.2 |
| 2012/0200524 A1* | 8/2012 | Vallis | G06F 3/044 345/174 |
| 2012/0206399 A1* | 8/2012 | Wang | G06F 3/0418 345/174 |
| 2012/0319994 A1* | 12/2012 | Hatano | G06F 3/044 345/174 |
| 2013/0063370 A1* | 3/2013 | Lee | G06F 3/0418 345/173 |
| 2013/0093719 A1* | 4/2013 | Tokutake | G06F 3/0416 345/174 |
| 2013/0094719 A1* | 4/2013 | Haddad | G06F 3/011 382/115 |
| 2013/0154993 A1* | 6/2013 | Hristov | G06F 3/041 345/174 |
| 2013/0176274 A1* | 7/2013 | Sobel | G06F 3/0416 345/174 |
| 2013/0176275 A1* | 7/2013 | Weaver | G06F 3/0416 345/174 |
| 2014/0225865 A1* | 8/2014 | Fink | G06F 3/041 345/174 |
| 2015/0052481 A1* | 2/2015 | Ronkainen | G06F 3/0416 715/815 |
| 2015/0054780 A1* | 2/2015 | Manba | G06F 3/044 345/174 |
| 2015/0153897 A1* | 6/2015 | Huang | G06F 3/0481 345/173 |
| 2015/0185924 A1* | 7/2015 | Chang | G06F 3/044 345/174 |
| 2015/0199030 A1* | 7/2015 | Mikkola | G06F 3/0489 345/157 |
| 2015/0378510 A1* | 12/2015 | Cheong | G06F 3/0416 345/178 |
| 2016/0070413 A1* | 3/2016 | Geaghan | G06F 3/0416 345/174 |
| 2016/0077620 A1* | 3/2016 | Choi | G06F 3/04883 345/173 |
| 2016/0077641 A1* | 3/2016 | Gowreesunker | G06F 3/0412 345/173 |
| 2016/0110013 A1* | 4/2016 | Yu | G06F 3/0416 345/173 |
| 2016/0179241 A1* | 6/2016 | Vandermeijden | G06F 3/044 345/174 |
| 2016/0274726 A1* | 9/2016 | Chung | G06F 3/014 |
| 2017/0034331 A1* | 2/2017 | Hao | G06F 3/0488 |

\* cited by examiner

| sv1 | sv2 | | | | | | | | |
|---|---|---|---|---|---|---|---|---|---|
| -2 | -3 | -3 | 4 | -8 | -2 | 5 | -4 | 5 | 10 | -2 |
| -9 | -2 | 5 | -10 | -11 | -6 | 11 | 1 | 4 | -1 | -2 |
| 2 | -3 | -10 | -8 | 5 | -6 | 2 | -2 | 8 | -7 | -1 |
| 9 | 9 | -6 | 5 | 4 | -3 | 4 | 20 | -19 | -11 | -3 |
| 8 | -1 | -11 | 2 | 15 | -3 | 13 | 9 | 3 | -18 | -6 |
| 12 | -1 | -3 | -7 | 10 | -4 | -2 | 6 | 10 | 1 | 5 |
| -15 | -4 | 0 | -2 | 9 | 6 | 7 | 9 | -12 | 2 | 0 |
| -2 | 14 | 0 | 1 | 1 | 4 | 1 | 1 | 0 | 0 | 9 |
| 8 | 6 | -2 | 4 | 0 | -4 | 8 | 4 | 9 | 1 | 2 |
| -8 | 17 | 15 | 1 | 3 | 9 | -1 | -2 | 12 | 2 | 0 |
| -5 | -5 | -12 | -6 | 0 | -12 | -5 | -9 | 2 | 10 | 2 |
| -12 | 12 | -5 | 13 | -7 | 4 | 8 | 9 | 1 | 1 | 2 |
| -13 | -11 | -18 | 3 | -12 | -1 | -4 | -2 | 13 | -8 | 0 |
| -7 | 4 | 10 | 1 | 6 | 0 | 4 | -9 | 0 | -10 | -9 |
| -5 | 6 | -9 | 6 | 3 | -5 | 4 | 5 | -5 | 1 | 2 |
| -15 | 13 | -5 | 6 | 4 | -4 | -2 | 5 | 6 | 7 | 1 |
| -4 | -1 | 5 | -4 | 1 | 6 | -3 | 3 | 0 | -11 | 5 |
| -3 | -4 | 3 | -6 | -7 | 6 | -10 | 3 | 7 | -4 | -5 |
| 1 | 5 | 6 | 8 | 9 | 3 | 14 | -5 | 3 | 4 | 4 |

FIG. 2

METHOD AND ASSOCIATED CONTROLLER FOR ADAPTIVELY ADJUSTING TOUCH CONTROL THRESHOLD

This application claims the benefit of Taiwan application Serial No. 104128327, filed Aug. 28, 2015, the subject matter of which is incorporated herein by reference.

BACKGROUND OF THE INVENTION

Field of the Invention

The invention relates in general to a method and associated controller for adaptively adjusting a touch control threshold, and more particularly, to a method and associated controller for adaptively adjusting a touch control threshold to effectively eliminate touch sensing noise and to adapt to different kinds of touch control (e.g., fingers, a stylus, a glove and floating gestures).

Description of the Related Art

The touch function is extensively applied in various kinds of modern electronic products, e.g., smart phones, tablet computers, laptop computers, all-in-one computers, wearable devices (e.g., smart watches), digital cameras, digital camcorders, game consoles and navigation systems. An essential and decisive feature of the touch function is the capability of correctly distinguishing between meaningless noise and intended touch control of a user.

SUMMARY OF THE INVENTION

To distinguish between noise and valid user touch control, a touch control threshold is set. A potential touch control is determined to be noise if sample values a touch panel senses at different sensing positions are smaller than the touch control threshold. Characteristics of noise change with the environmental factors (e.g., the temperature, moisture, or existence of other conductive objects and electrical appliances) of the touch panel. However, in the prior art, this touch control threshold is a constant value that cannot be adaptively adjusted. As a result, a misjudgment is likely incurred, in a way that noise is misjudged as a valid touch control and/or a valid touch control is misjudged as noise.

It is a primary object of the present invention to provide a method for adaptively controlling a touch control threshold for a touch panel (e.g., 106, FIG. 1). The method includes: obtaining a set of sample values of a frame from the touch panel (e.g., step 502); calculating a mean value and a standard deviation based on the set of sample values according to a determination result indicating that the set of sample values are not greater than the touch control threshold (e.g., steps 504 to 506); and generating an updated touch control threshold according to the mean value and the standard deviation (e.g., steps 508 and 510).

In one embodiment, the step of generating the updated touch control threshold according to the mean value and the standard deviation includes: generating a reference threshold according to a linear combination of the mean value and the standard deviation, and generating the updated control threshold according to a weighted superimposition of the reference threshold and the touch control threshold.

In one embodiment, the step of generating the updated touch control threshold according to the mean value and the standard deviation includes: generating a reference threshold according to a linear combination of the mean value and the standard deviation, and generating the updated touch control threshold according to a moving average of the reference threshold and a previous reference threshold.

In one embodiment, the method further includes: obtaining another set of sample values of another frame from the touch panel (e.g., iterating step 502 from step 512), wherein the set of sample values include a set of adjacent sample values, and all sample values in the set of adjacent sample values are greater than the updated touch control threshold (e.g., steps 504 to 514); generating an area of a touch point according to the number of sample values in the set of adjacent sample values (e.g., step 514); generating an area threshold according to an average difference between the set of adjacent sample values of the touch point and the updated touch control threshold (e.g., step 516); updating a subsisting count value of the touch point according to a determination result indicating that the area of the touch point is greater than the area threshold (e.g., step 518); and determining that the touch point is a valid touch point according to a determination result indicating that the subsisting count value is greater than a subsisting threshold.

In one embodiment, the step of generating the area threshold according to the average difference between set of adjacent sample values and the updated touch control threshold includes: decreasing the area threshold according to a determination result indicating that the average difference is increased. In one embodiment, the method further includes: generating the subsisting threshold according to the average difference between the set of adjacent sample values and the updated touch control threshold. For example, the subsisting threshold is decreased according to a determination result indicating that the average difference is increased.

In one embodiment, the method further includes: obtaining another set of sample values of another frame (e.g., iterating step 502 from step 512), wherein the another set of sample values include one of multiple sets of adjacent sample values, and all of the sample values in the one or multiple sets of adjacent sample values are greater than the updated touch control threshold (e.g., steps 504 to 514); generating an area of one or multiple touch points according to the number of sample values in the one or multiple sets of adjacent sample values (e.g., step 504); calculating another mean value and another standard deviation according to the another set of sample values and a determination result indicating that the area of the one or multiple touch points is smaller than an area threshold (e.g., step 518 to step 506); and updating the touch control threshold according the another mean value and the another standard deviation (e.g., step 510).

In one embodiment, the method further includes: setting the standard deviation as a predetermined standard deviation according to a determination result indicating that the standard deviation is smaller than a standard deviation threshold. The step of generating the updated touch control threshold according to the mean value and the standard deviation includes: generating the updated touch control threshold according to the mean value and the predetermined standard deviation.

It is another object of the present invention to provide a controller including an interface circuit and a core circuit. The interface circuit is coupled to a touch panel. The core circuit is coupled to the interface circuit, and is capable of performing the above method.

The above and other aspects of the invention will become better understood with regard to the following detailed description of the preferred but non-limiting embodiments. The following description is made with reference to the accompanying drawings.

BRIEF DESCRIPTION OF THE DRAWINGS

FIG. 2 shows exemplary sample values when the touch panel in FIG. 1 is not touched;

DETAILED DESCRIPTION OF THE INVENTION

Figure 1:
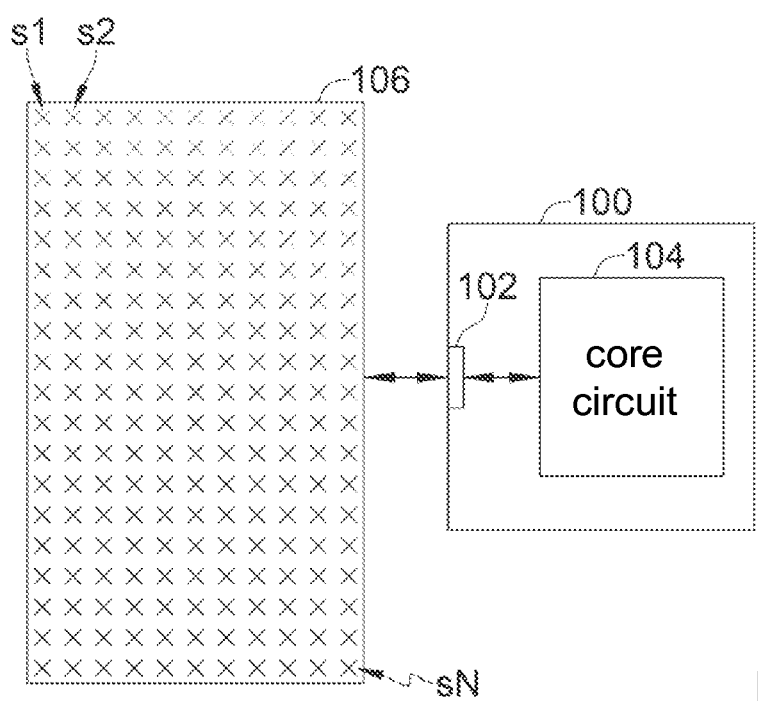
FIG. 1 is a controller for a touch panel according to an embodiment of the present invention.

FIG. 1 shows a controller 100 according to an embodiment of the present invention. The controller 100 may be applied to a touch panel 106, which may be a touch display panel. As shown in FIG. 1, the controller 100 includes an interface circuit 102 and a core circuit 104. The interface circuit 102 is coupled to the touch panel 106. The core circuit 104 may be a logic operation processing circuit and is coupled to the interface circuit 102. The touch panel senses capacitance changes at N sensing positions s1, s2, . . . , and sN to generate N sample values sv1, sv2, . . . , and sVN (not shown in FIG. 1) of a frame, and transmits these N sample values sv1, sv2, . . . , and sVN to the core circuit 104 via the interface circuit 102 for further touch control processing.

Figure 3:
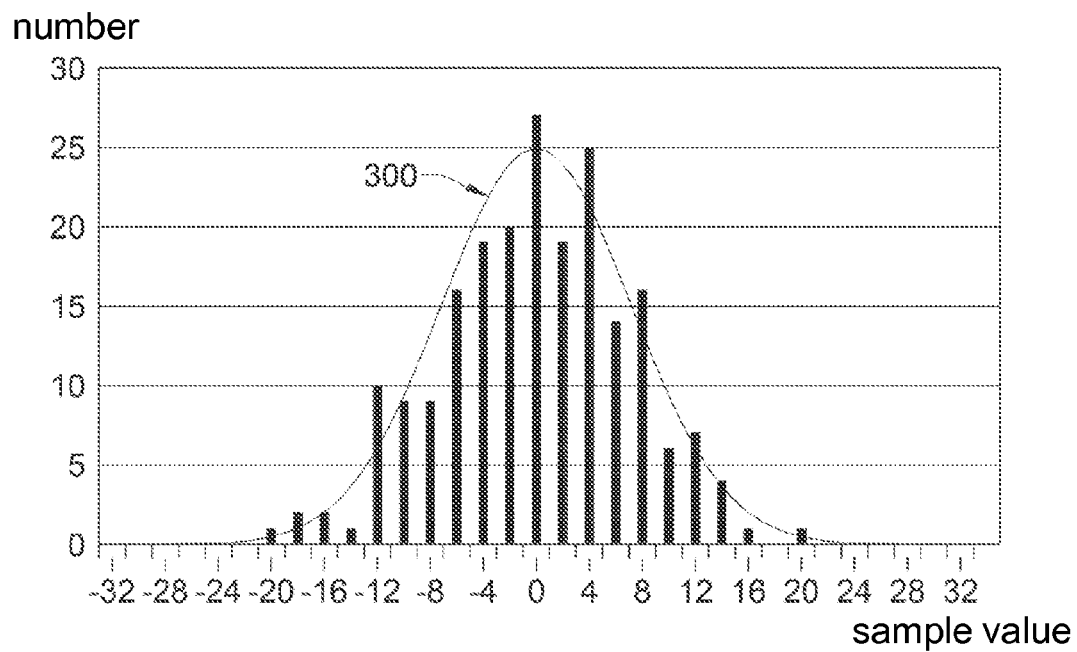
FIG. 3 and FIG. 4 illustrate principles of the present invention.
Figure 4:
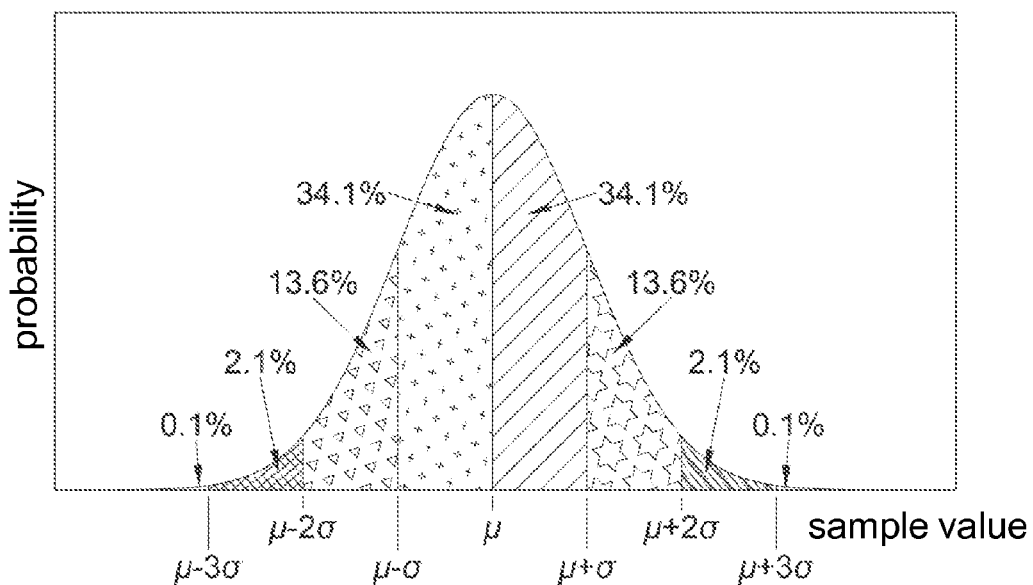

FIG. 2 shows an example of the sample values sv1 to sv209 of a frame when the touch panel 106 is not touched. In other words, the sample values sv1 to sv209 may represent sample values of noise. FIG. 3 shows a histogram of the sample values sv1 to sv209 of noise. It is discover by the Applicant that, the sample values of noise substantially display a normal distribution, as shown by a curve 300 in FIG. 3. FIG. 4 shows a normal distribution of sample values of ideal noise, where $\mu$ is a mean value and $\sigma$ is a standard deviation. Known from statistics, sample values of 84.1% of noise are smaller than $(\mu+\sigma)$, sample values of 97.7% of noise are smaller than $(\mu+2\sigma)$, sample values of 99.8% of noise are smaller than $(\mu+3\sigma)$, and sample values of 99.9% of noise are smaller than $(\mu+4\sigma)$. Thus, a linear combination of a mean value and a standard deviation of noise may be used as a threshold for determining noise.

Figure 5:
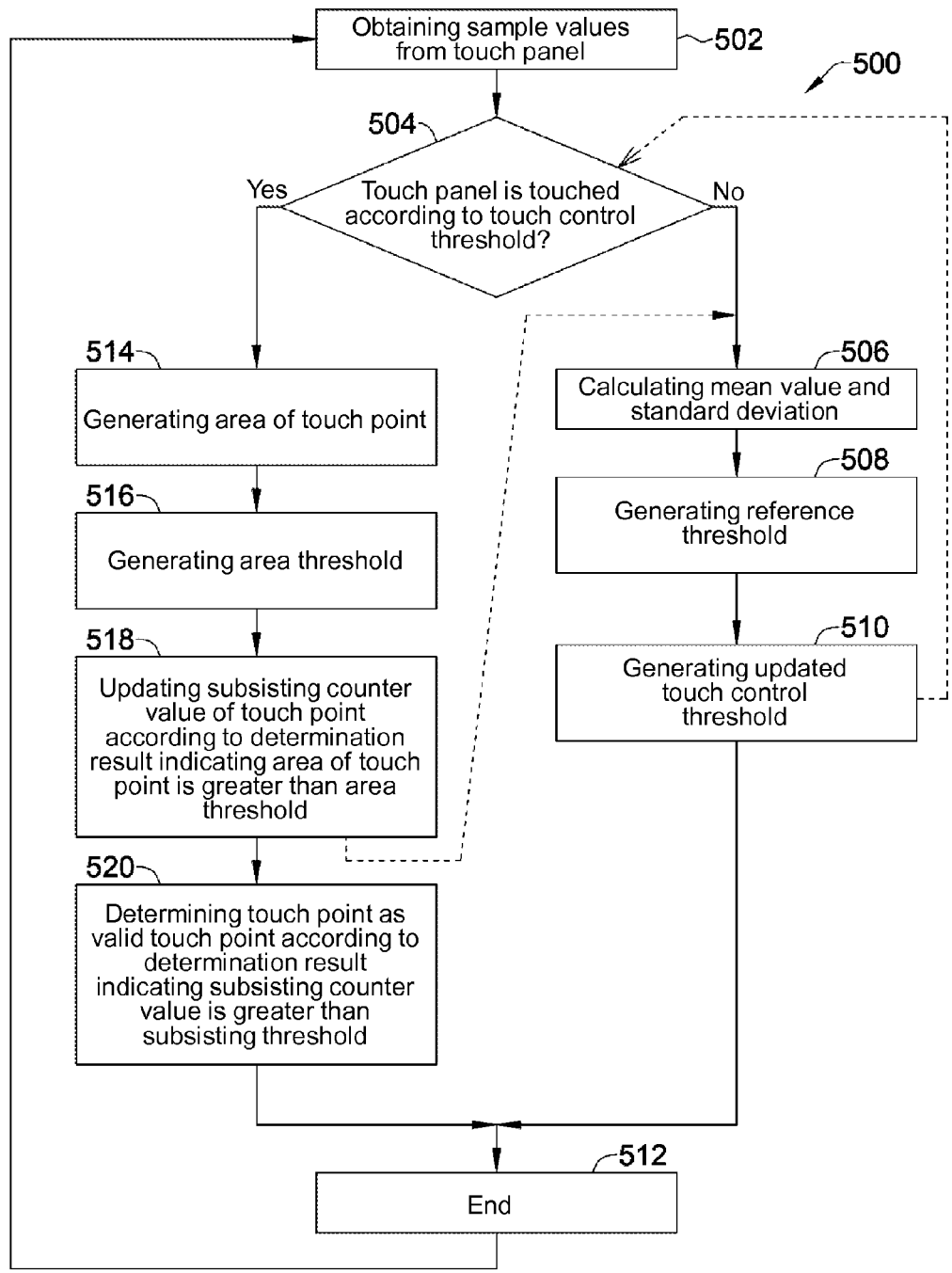
FIG. 5 shows a process according to an embodiment of the present invention.

FIG. 5 shows a process 500 performed by the core circuit 104 according to an embodiment of the present invention, with associated details described below.

In step 502, a set of sample values are obtained from the touch panel 106. In one embodiment, the set of sample values may be N sample values sv1 to svN of a frame from the touch panel 106, e.g., 19*11 sample values sv1 to sv209 of one frame shown in FIG. 2.

In step 504, it is determined whether the touch panel 106 is touched according to the set of sample values and a touch control threshold THR[t] (not shown). Step 514 is performed if so, or else step 506 is performed if not. In one embodiment, if N sample values sv1 to svN of a frame are not greater than the touch control threshold THR[t], it is determined that the touch panel 106 is not touched. Conversely, when any of the N sample values sv1 to svN of the frame is greater than the touch control threshold THR[t], it is determined that the touch panel 106 is touched. Taking the sample values sv1 to sv209 in FIG. 2 for example, assuming that the sample values sv1 to sv209 are not greater than the touch control threshold THR[t], it is determined that the touch panel 106 is not touched, and step 506 is performed as the sample values sv1 to sv209 should represent sample values of noise.

In step 506, a mean value and a standard deviation are calculated according to the set of sample values. For example, a mean value M[t] may be a mean value m0 of the sample values sv1 to svN of the frame (i.e., $M[t]=m0=\Sigma_{i=1}^{N} sv_i/N$), and a standard deviation SD[t] may be a standard deviation s0 of the sample values sv1 to sv209 of the frame (i.e., $SD[t]=s0=\sqrt{\Sigma_{i=1}^{N}(sv_i-m0)^2/N}$. Taking the sample values sv1 to sv209 in FIG. 3 for example, the mean value M[t]=0.435, and the standard deviation SD[t]=7.144. In another embodiment, the mean value M[t] may be a mean value of sample values of the frame and those of the previous frame, and the standard deviation SD[t] may be a standard deviation of the frame and the previous frame.

In step 508, a reference threshold thr[t] is generated according to a linear combination of the mean value and the standard deviation. In one embodiment, the reference threshold thr[t]=M[t]+a0*SD[t], where a0 may be a predetermined value and greater than 0, e.g., a0=4. In another embodiment, if the standard deviation SD[t] is smaller than a standard threshold SDthr (SDthr>0, not shown), the reference threshold thr[t] is generated according to the mean value M[t] and a predetermined standard deviation SD0 (SD0>0, not shown), e.g., the reference threshold thr[t]=M[t]+a0*SD0. The predetermined standard deviation SD0 may be equal to the standard threshold SDthr. On the other hand, if the standard deviation SD[t] is not smaller than the standard deviation threshold SDthr, the reference threshold thr[t] is generated according to the mean value Mt[t] and the standard deviation SD[t], e.g., the reference threshold thr[t]=M[t]+a0*SD[t].

In step 510, the touch control threshold THR[t] is updated to THR[t+1] according to the reference threshold thr[t]. In one embodiment, the reference threshold thr[t] may be directly used as the updated touch control threshold THR[t+1] (i.e., THR[t+1]=thr[t]). In another embodiment, the touch control threshold THR[t] may be updated according to a weighted superimposition of the reference threshold thr[t] and the touch control threshold THR[t]. For example, the updated touch control threshold THR[t+1]=THR[t]*(1−r0)+thr[t]*r0, where r0 is a predetermined ratio between 0 and 1, e.g., r0=0.7. Compared to directly using the reference threshold as the updated touch control threshold, using the weighted superimposition of the reference threshold and the touch control threshold to update the touch control threshold provides the touch control threshold with a more moderate change, such that the touch control threshold does not change drastically even when the reference threshold is greatly changed. In another embodiment, may be updated according to a moving average of the reference threshold and a previous reference threshold. For example, the updated touch control threshold $THR[t+1]=\Sigma_{k=0}^{K}(b_k \cdot thr[t-k])$, where thr[t−k] represents a previous reference threshold calculated in step 508 performed by a previous $k^{th}$ time, the item $b_k$ may be a predetermined coefficient, and the number K may be greater than or equal to 1. If the process 500 later again performs step 504, it is then determined whether the touch panel 106 is touched according to the updated touch control threshold THR[t+1].

In step 512, the process 500 ends.

In continuation of the example in FIG. 3, by directly taking the reference threshold as the updated touch control threshold and the touch control threshold a0=4 for instance, the updated touch control threshold THR[t+1]=0.435+4*7.144=29. Ideally, when the sample values of noise display a normal distribution, sample values of 99.9% of noise is smaller than 29. Thus, when the touch control threshold THR[t+1] is set to 29, only 0.1% of noise is misjudged, i.e., the noise misjudgment rate is 0.1%. Similarly, the noise misjudgment rate is increased to 0.2% according to the touch control threshold calculated for a0=3, and the noise misjudgment rate is increased to 2.3% according to the touch control threshold for a0=2. It is known that, using the linear combination of a mean value and a standard deviation of sample values of noise as the touch control threshold is capable of effectively identifying noise. As an application environment of a touch panel may vary, the sample values of noise may also change. Thus, by using the linear combination of a mean value and a standard deviation as the touch control threshold, the touch control threshold may dynamically follow the change in the sample values of noise to effectively identify most part of noise.

Figure 6:
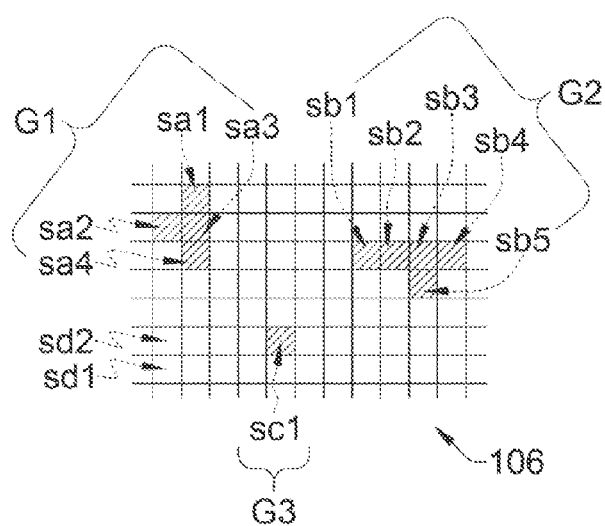
FIG. 6 is an example for illustrating steps in FIG. 5.

In another embodiment, the updated touch control threshold may be obtained from another set of sample values of another frame of the touch panel 106 (step 502). The another set of sample values include one or multiple sets of adjacent sample values, and all of the sample values in each set of adjacent sample values are greater than the updated touch control threshold THR[t+1]. A principle for determining whether two sensing positions are adjacent may be whether upper, lower, left or right parts of the two sensing positions are adjacent. For example, as shown in FIG. 6, sample values of adjacent sensing positions sa1 to sa4, sb1 to sb5 and sc1 (i.e., adjacent sample values) are all greater than the touch control threshold THR[t+1] (represented by shaded parts in FIG. 6), and sample values of the remaining sensing positions (e.g., sd1 and sd2) are smaller than the touch control threshold THR[t+1].

In step 514, an area of a touch point is generated according to the number of sample values in the set of adjacent sample values. Each set of the adjacent sample values may form a touch point, and the area of the touch point may be associated with the number of sample values included in the set of adjacent sample values. For example, in continuation of the example in FIG. 6, four sensing positions sa1 to sa4 are adjacent to one another to form a touch point G1, which has an area A1=4. Similarly, five sensing positions sb1 to sb5 are adjacent to one another and are not adjacent to the sensing positions sa1 to sa4, and so the sensing positions sb1 to sb5 form another touch point G2, which has an area A2=5. The one sensing position sc1 is not adjacent to any other sensing positions sa1 to sa4 and sb1 to sb5, and may thus independently form a touch point G3, which has an area A3=1.

In step 516, an area threshold is generated according to an average difference between the set of sample values of the touch point and the updated touch control threshold. In one embodiment, a corresponding area threshold may be generated for each of the touch points according to the average difference between each set of sample values of each touch point as well as the updated touch control threshold THR [t+1]. For example, as the average difference between a set of adjacent sample values of a touch point and the updated touch control threshold THR[t+1] gets larger, the area threshold corresponding to the touch point is made smaller. For example, in continuation of the example in FIG. 6, if the average difference between the sample values of the sensing positions sa1 to sa4 of the touch point G1 and the updated touch control threshold THR[t+1] is 10, the average difference between the sample values of the sensing positions sb1 to sb5 of the touch point G2 and the updated touch control threshold THR[t+1] is 15, and the average difference between the sample value of the sensing position sc1 of the touch point G3 and the updated touch control threshold THR[t+1] is 20, an area threshold AT1 corresponding to the touch point G1 may be set to 3 and area thresholds AT2 and AT3 (not shown) respectively corresponding to the touch points G2 and G3 may be set to a smaller value of 2. Apart from setting the area thresholds of the touch points according to means of differences (i.e., average differences) between the sample values of respective touch points and the updated touch control threshold THR[t+1], in one embodiment, a statistical value (e.g., a maximum, a minimum or a median) is generated according to differences between the sample values of respective touch points and the updated touch control threshold THR[t+1], and the area thresholds of respective touch points are accordingly set. For example, in the touch point G1 in FIG. 6, assume that the four sample values of the sensing positions sa1 to sa4 are respectively sva to sva4 (not shown), the differences between the sample values and the updated touch control threshold THR[t+1] are respectively d1=(sav1−THR[t+1]) to d4=(sav4−THR[t+1]). As such, to set the area threshold AT1 of the touch point G1, a statistical value is generated according to a statistical characteristic such as the maximum, minimum or median of these four values of the differences d1 to d4, and the area threshold AT1 is set according to the statistical value. For example, the area threshold A1 is decreased as the statistical value increases. One of the differences d1 to d4 may be selected as the statistical value. Alternatively, one subset may be selected from the differences d1 to d4, and a linear combination of elements in the subset is used as the statistical value (e.g., the subset may include a maximum and a minimum, and the statistical value may be calculated from a linear combination of the maximum and the minimum). Alternatively, a linear combination of the differences d1 to d4 may be used as the statistical value.

In step 518, a subsisting count value of the touch point is updated according to a determination result indicating that the area of the touch point is greater than the area threshold. In one embodiment, if the area of a touch point is greater than the corresponding area threshold, a subsisting count value of the touch point is updated. Conversely, if the area of a touch point is smaller than the corresponding area threshold, a subsisting count value of the touch point is not updated. For example, in continuation of FIG. 6, the area of the touch point G1 is A1=4, and the area threshold corresponding to the touch point G1 is AT1=3. If a subsisting count value of the touch point G1 already exists in the previous frame and is equal to C1=L (e.g., 13), the subsisting count value of the touch point G1 is updated as C1=L+1 (e.g., 14) because the area A1 of the touch point G1 is greater than the area threshold AT1. Similarly, the area of the touch point G2 is A2=5, and the area threshold corresponding to the touch point G2 is AT2=2. If the touch point G2 does not exist in the previous frame, a subsisting count value C2 (not shown) of the touch point G2 is initiated and C2=1 because the area A2 of the touch point G2 is greater than the area threshold AT2. In contrast, the area of the touch point G3 is A3=1, and the area threshold corresponding to the touch point G3 is AT3=2. If the touch point G3 does not exist in the previous frame, the subsisting count value G3 of the touch point G3 is not initiated; if the touch point G3 already exists in the previous frame, a subsisting count value C3 of the touch point G3 is deleted because the area A3 of the touch point G3 is smaller than the area threshold AT3.

In another embodiment, if the area of each touch point is smaller than the corresponding area threshold, it may be determined that the touch panel 106 is not touched, and step 506 is performed. That is, according to the determination result indicating that the areas of all of the touch points are smaller than the corresponding area thresholds, the mean value M[t+2] and the standard deviation SD[t+2] are calculated, and the touch control threshold is updated to THR[t+2].

In step 520, according to a determination result indicating that the subsisting count value of a touch point is greater than a subsisting threshold, it is determined that the touch point is a valid touch point. For example, in continuation of FIG. 6, assuming that the subsisting count value C1 of the touch point G1 is 14 and a subsisting threshold ET1 (not shown) of the touch point G1 is 10, it is determined that the touch point G1 is a valid touch point. On the other hand, assuming that the subsisting count value of the touch point G2 is equal to 1 and a subsisting threshold ET2 (not shown) of the touch point G2 is 4, it cannot yet be determined that the touch point G2 is a valid touch point. Step 512 may be performed after step 520.

In one embodiment, before step 520 is performed, the present invention sets the corresponding subsisting threshold for each set of adjacent sample values according to the difference between each set of adjacent sample values and the touch control threshold THR[t+1]. For example, as the average difference between a set of adjacent sample values of a touch point and the updated touch control threshold THR[t+1] gets larger, the subsisting threshold corresponding to the touch point gets smaller.

It is known from the foregoing description that, since the area threshold and/or subsisting threshold corresponding to each of the touch points may be set according to the differences between the adjacent sample values and the touch control threshold, the present invention is capable of adaptively adjusting not only the touch control threshold but also the area threshold in step 516 and/or the subsisting threshold in step 520. Being capable of dynamically setting the area threshold and/or the subsisting threshold promotes the adaptivity to different types of touch tools (e.g., fingers, a stylus, a glove or floating gestures). For example, as a touch point formed by a stylus or fingers has far greater sample values than the touch control threshold but a smaller area, the present invention may correspondingly reduce the area threshold due to large differences between the sample values and the touch control threshold, so that step 516 does not mistakenly leave the subsisting count value un-updated and hence deletes the subsisting count value due to a smaller area of the touch point. On the other hand, a touch point formed through a glove of floating gestures has a larger area and also longer duration but sample values only slightly greater than the touch control threshold THR[t+1]. Correspondingly, the present invention increases the area threshold and/or subsisting count value due to smaller differences between the sample values and the touch control threshold THR[t+1]. Thus, noise having a small area and shorter duration can be effectively eliminated, in a way that a touch control of a glove or floating gestures having lower sample values can be correctly determined.

In the process 500, steps 514 to 520 may be regarded as a touch point determination procedure. Steps 518 and 520 may be respectively regarded as filtering in the space and time domains, which may be jointly applied to further prevent a touch point determination error caused by noise. For example, assume that the touch control threshold has a 0.1% probability of misjudging noise as non-noise. That is, before step 514 is performed, although a sample value of one sensing position in fact represents noise, there is 0.1% of possibility of mistakenly regarding such sample point as an adjacent sample point of a touch point (to be referred to as a noise touch point). However, when step(s) 518 and/or 520 is performed, if the area threshold and the subsisting threshold of the touch point are respectively 3 and 5, because noise is misjudged as non-noise only when the sample values of three adjacent sensing positions are determined as non-noise, the probability of mistakenly updating the subsisting count value for the noise touch point in step 518 is reduced to 0.1% to a power of 3. Further, because the subsisting count value of the noise touch point exceeds the subsisting threshold only when errors occur in step 520 for five times, the probability of misjudging noise as a valid touch point in step 520 is further reduced to 0.1% to the power of 15.

The process 500 is capable of not only generating/maintaining/updating one touch control threshold (step 510) according to a reference threshold (step 508), but also generating/maintain/updating multiple touch control thresholds according to multiple reference values to distinguish different types of touch control. For example, two kinds reference thresholds thr[t]=M[t]+4*SD[t] and thr1[$t$]=M[t]+3*SD[t], respectively corresponding to two kinds of touch control, e.g., stylus touch control and glove touch control, are generated. In step 510, the touch control threshold THR[t+1] may be calculated/updated according a moving average of the reference threshold thr[t] and a previous reference threshold (e.g., thr[t−1]), and another touch control threshold THR[t+1] may be calculated/updated according to a moving average of the reference threshold thr1[$t$] and the previous reference threshold (e.g., thr1[$t$−1]). As such, performing steps 514, 516, 518 and 520 according to the touch control threshold THR[t+1] allows detection, identification and reporting of a valid touch point of a stylus, and performing steps 514, 516, 518 and 520 allows detection, identification and reporting of a valid touch point of glove touch control. After the valid touch point is identified in step 520, in addition to reporting the area and position of the valid touch point, the type of the valid touch points (or the type of touch control threshold based upon) may also be reflected by using a touch control type flag. For example, the touch control type flag may reflect whether the valid touch points are touch control of a stylus (based on the touch control threshold THR[t+1]) or touch control of a glove (based on the touch control threshold THR1[$t$+1]). Further, a reference threshold thr2[$t$] in step 508 may also be a negative value that linearly combines the standard deviation SD[t] into the mean value MM. For example, the reference threshold thr2[$t$] may be equal to M[t]−4*SD[t]. Accordingly, the touch control threshold THR2[$t$+1] established/maintained/updated according to the reference threshold thr2[$t$] may be used to distinguish between noise and water marks as water marks form negative sample values on the touch panel.

In step 508, while the reference threshold thr[t]=M[t]+a0*SD[t] is calculated, the value of the parameter a0 may also be dynamically adjusted. Steps 506, 508 and 510 may be periodically or non-periodically performed, or may be determined whether to be performed according to a timer value and/or other status values (e.g., whether an electronic device is operating in a power-saving status). For example, step 504 may be that, only when all sample values of a same frame are smaller than the touch control threshold THR[t] and the timer value is greater than a timer threshold (e.g., 500 ms), step 506 is performed. When the touch control threshold THR[t+1] is updated in step 510, the timer value may be jointly reset to 0, and the duration is again timed from 0 ms. Thus, steps 506, 508 and 510 are performed at an interval of 500 ms.

When step 506 is performed, the number M may be a total number N of samples of one frame. For example, the touch panel 106 may be a touch panel having a smaller size (or a smaller resolution), and so the number N is smaller, e.g., 5. In contrast, the number M may be 105. As one frame only provides 35 sample values, when step 506 is performed for the first time, only 35 sample values are collected, which is less the M (105). Thus, step 506 may be skipped with the mean value and the standard deviation not yet calculated, steps 508 and 510 are also skipped, and step 512 is directly performed. When step 506 is performed for second time, 35 sample values of another frame are collected, and 70 sample values, which is still smaller than M, are accumulated. Thus, step 506 may be skipped with the mean value and the standard deviation not yet calculated, steps 508 and 510 are also skipped, and step 512 is directly performed. When step 506 is performed for the third time, 35 sample values of another frame are collected, and a total of 105 sample values, which satisfies M sample values, are accumulated. Therefore, step 506 may calculate the mean value and the standard deviation for the M sample values, and steps 508 and 510 can then be performed.

In conclusion, compared to conventional technologies with a constant touch control threshold, the present invention is capable of dynamically re-calculating and updating the touch control threshold according to sample values prior to touch control to adapt to different application backgrounds and environments. Further, area filtering (step 518) and subsisting filtering (step 520) are jointly applied to further reduce the probability of misjudging noise as a valid touch point, and the area threshold for setting the area filtering and the subsisting threshold for setting the subsisting filtering are adaptively set according to differences of respective sample values and the touch control threshold. Thus, the present invention can be extensively applied in response to different types of touch control, e.g., touch control of a stylus, fingers, a glove and floating gestures.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for adaptively adjusting a touch control threshold, applied to a touch panel, the method comprising:
   obtaining a set of sample values from the touch panel;
   determining whether each of the set of sample values is not greater than the tough panel control threshold;
   updating the touch control threshold, which is used to compare with a sample value, using a mean value and a standard deviation of the set of sample values according to a determination result indicating that each of the set of sample values is not greater than the touch control threshold;
   obtaining another set of sample values from the touch panel, wherein the another set of sample values comprise a set of adjacent sample values, and all sample values in the set of adjacent sample values are greater than the updated touch control threshold;
   generating an area of a touch point according to the number of sample values in the set of adjacent sample values;
   generating an area threshold according to an average difference between the set of adjacent sample values and the updated touch control threshold;
   updating a subsisting count value of the touch point according to a determination result indicating that the area of the touch point is greater than the area threshold;
   determining that the touch point is a valid touch point according to a determination result indicating that the subsisting count value is greater than a subsisting threshold; and
   generating the subsisting threshold according to the average difference between the set of adjacent sample values and the updated touch control threshold.

2. The method according to claim 1, wherein the step of updating the touch control threshold using the mean value and the standard deviation comprises:
   generating a reference threshold according to a linear combination of the mean average and the standard deviation; and
   updating the touch control threshold according to a weighted superimposition of the reference threshold and the touch control threshold.

3. The method according to claim 1, wherein the step of updating the touch control threshold using the mean value and the standard deviation comprises:
   generating a reference threshold according to a linear combination of the mean value and the standard deviation; and
   updating the touch control threshold according to a moving average of the reference threshold and a previous reference threshold.

4. The method according to claim 1, wherein the step of generating the area threshold according to the average difference between the set of adjacent sample values and the updated touch control threshold comprises:
   decreasing the area threshold according to a determination result indicating that the average difference is increased.

5. The method according to claim 1, wherein the step of generating the subsisting threshold according to the average difference between the set of adjacent sample values and the updated touch control threshold comprises:
   decreasing the subsisting threshold according to a determination result indicating that the average difference is increased.

6. The method according to claim 1, further comprising:
   obtaining still another set of sample values from the touch panel, wherein the still another set of sample values comprise one or multiple sets of adjacent sample values, and all sample values in the one or multiple sets of adjacent sample values are greater than the updated touch control threshold;
   generating an area/areas of one or multiple touch points according to the number of sample values in the one or multiple sets of adjacent sample values;
   calculating another mean value and another standard deviation based on the still another set of sample values according to a determination result indicating that the areas of the one or multiple touch points are all smaller than an area threshold; and
   updating the updated touch control threshold according to the another mean value and the another standard deviation.

7. The method according to claim 1, wherein the step of updating the touch control threshold using the mean value and the standard deviation comprises:
   updating the touch control threshold based on the mean value and a predetermined standard deviation according to a determination result indicating that the standard deviation is smaller than a standard deviation threshold.

8. A controller, applied to a touch panel, the controller comprising:
- an interface circuit, coupled to the touch panel; and
- a core circuit, coupled to the interface circuit, performing steps of:
- obtaining a set of sample values from the touch panel;
- determining whether each of the set of sample values is not greater than the touch control threshold;
- updating the touch control threshold, which is used to compare with a sample value, using a mean value and a standard deviation of the set of sample values according to a determination result indicating that each of the set of sample values is not greater than the touch control threshold;
- obtaining another set of sample values from the touch panel, wherein the another set of sample values comprise a set of adjacent sample values, and all sample values in the set of adjacent sample values are greater than the updated touch control threshold;
- generating an area of a touch point according to the number of sample values in the set of adjacent sample values;
- generating an area threshold according to an average difference between the set of adjacent sample values and the updated touch control threshold;
- updating a subsisting count value of the touch point according to a determination result indicating that the area of the touch point is greater than the area threshold;
- determining that the touch point is a valid touch point according to a determination result indicating that the subsisting count value is greater than a subsisting threshold; and
- generating the subsisting threshold according to the average difference between the set of adjacent sample values and the updated touch control threshold.

9. The controller according to claim 8, wherein the step of updating the touch control threshold using the mean value and the standard deviation comprises:
- generating a reference threshold according to a linear combination of the mean average and the standard deviation; and
- updating the touch control threshold according to a weighted superimposition of the reference threshold and the touch control threshold.

10. The controller according to claim 8, wherein the step of updating the touch control threshold using the mean value and the standard deviation comprises:
- generating a reference threshold according to a linear combination the mean value and the standard deviation, and updating the touch control threshold according to a moving average of the reference threshold and a previous reference threshold.

11. The controller according to claim 8, wherein the step of generating the area threshold according to the average difference between the set of adjacent sample values and the updated touch control threshold comprises:
- decreasing the area threshold according to a determination result indicating that the average difference is increased.

12. The controller according to claim 8, wherein the step of generating the subsisting threshold according to the average difference between the set of adjacent sample values and the updated touch control threshold comprises:
- decreasing the subsisting threshold according to a determination result indicating that the average difference is increased.

13. The controller according to claim 8, wherein the core circuit further performs steps of:
- obtaining still another set of sample values from the touch panel, wherein the still another set of sample values comprise one or multiple sets of adjacent sample values, and all sample values in the one or multiple sets of adjacent sample values are greater than the updated touch control threshold;
- generating areas of one or multiple touch points according to the number of sample values in the one or multiple sets of adjacent sample values;
- calculating another mean value and another standard deviation according to the still another set of sample values and a determination result indicating that the areas of the one or multiple touch points are smaller than an area threshold; and
- updating the updated touch control threshold according to the another mean value and the another standard deviation.

14. The controller according to claim 8, wherein the step of updating the touch control threshold using the mean value and the standard deviation comprises:
- updating the touch control threshold based on the mean value and a predetermined standard deviation according to a determination result indicating that the standard deviation is smaller than a standard deviation threshold.

\* \* \* \* \*